United States Patent [19]
Wataya et al.

[11] Patent Number: 5,879,647
[45] Date of Patent: Mar. 9, 1999

[54] METHOD FOR THE PREPARATION OF FINE GLOBULAR PARTICLES OF YTTRIUM OXIDE

[75] Inventors: Kazuhiro Wataya; Shigeru Sakai, both of Fukui-ken, Japan

[73] Assignee: Shin-Etsu Chemical Co., Ltd., Japan

[21] Appl. No.: 968,612

[22] Filed: Nov. 13, 1997

[30] Foreign Application Priority Data

Nov. 13, 1996 [JP] Japan .................................. 8-301642

[51] Int. Cl.$^6$ ...................................................... C01F 17/00
[52] U.S. Cl. ........................... 423/263; 23/295 R; 23/301; 23/305 RE; 423/415.1; 423/419.1; 501/94; 502/8; 502/9; 502/10
[58] Field of Search ..................................... 423/592, 263, 423/415.1, 419.1; 501/94; 502/8, 9, 10; 23/295 R, 301, 305 RE

[56] References Cited

U.S. PATENT DOCUMENTS

| | | | |
|---|---|---|---|
| 4,238,467 | 12/1980 | Dugan et al. | 423/263 |
| 4,695,439 | 9/1987 | Ritsko et al. | 423/263 |
| 4,895,832 | 1/1990 | Chang et al. | 501/1 |
| 5,413,736 | 5/1995 | Nishisu et al. | 252/301.4 R |
| 5,545,386 | 8/1996 | Kaneyoshi et al. | 423/263 |
| 5,635,154 | 6/1997 | Arai et al. | 423/592 |

OTHER PUBLICATIONS

Journal of Colloid and Interface Science, vol. 122, No. 1, pp. 47–59, Mar. 1988.
Skoog, Douglas A.& West, Donald M. Fundamentals of Analytical Chemistry. "The Technique of Homogeneous Precipitation". Hotl, Rine & Winston, Inc. : New York. Copyright 1963. pp. 188–191.

*Primary Examiner*—Gary P. Straub
*Assistant Examiner*—Cam N. Nguyen
*Attorney, Agent, or Firm*—Wenderoth, Lind & Ponack, L.L.P.

[57] ABSTRACT

An improvement is proposed in the so-called urea method for the preparation of fine particles of yttrium oxide, according to which, while an aqueous reaction mixture containing a water-soluble yttrium salt, e.g., nitrate, and urea dissolved therein in specified concentrations is heated at 90° to 100° C. to effect precipitation of yttrium carbonate hydroxide particles followed by calcination of the carbonate hydroxide in air into yttrium oxide, the aqueous reaction mixture is diluted with addition of a specified volume of preheated water within a critical period between incipient appearance of turbidity in the reaction mixture by the precipitation of the carbonate hydroxide and a moment 30 minutes thereafter. In this way, the yttrium oxide particles obtained have a globular particle configuration with a very small average particle diameter $D_{50}$ in the range from 0.1 to 0.3 μm and are suitable for use in various fine applications.

7 Claims, No Drawings

METHOD FOR THE PREPARATION OF FINE GLOBULAR PARTICLES OF YTTRIUM OXIDE

BACKGROUND OF THE INVENTION

The present invention relates to a method for the preparation of fine globular particles of yttrium oxide or, more particularly, to a method for the preparation of fine particles of yttrium oxide having a globular or spherical particle configuration and having usefulness as a base material of a sintered body of yttrium oxide, sintering aid of various kinds of ceramic materials, base material of luminescent phosphors, coating agent on the particles of a luminescent phosphor and so on by virtue of absence of agglomeration and good dispersibility of particles.

While yttrium oxide powders are used widely in the above mentioned applications, it is desirable that the particles of the yttrium oxide powder therefor are as fine as possible to have a particle diameter in a submicron range and also the particles have dispersibility as high as possible. Such fine particles of yttrium oxide can be prepared in two different ways in the prior art. The first of the known methods therefor is to mechanically comminute separately prepared particles of yttrium oxide having a coarse particle diameter exceeding the desired submicron order by the use of a suitable pulverizing machine such as beads mills, optionally, with addition of a dispersing aid. This mechanical method, however, is industrially not feasible due to several problems and disadvantages. For example, it is by no means possible to avoid contamination of the yttrium oxide particles by the materials of the pulverizing machine and the beads as the pulverization medium as well as by the dispersing aid, when used. In addition, the efficiency of conventional pulverizing machines is generally not high enough when the desired particle size of the powder concerned is so fine as in the submicron range so that the productivity of the method is low as an industrial process.

As a natural consequence of the particle size reduction by a mechanical means, moreover, the particles obtained by this mechanical pulverization method usually have an irregular particle configuration with rugged surfaces as is evidenced by the discrepancy between the specific surface area obtained by the so-called BET method utilizing adsorption of nitrogen molecules and the imaginary specific surface area estimated by calculation from the value of the average particle diameter $D_{50}$ of the particles assuming a perfectly spherical particle configuration and monodispersed distribution of the particle diameters, the former value usually being much greater than the latter. This discrepancy is presumably due to the fact that the specific surface area obtained by the BET method involves the additional areas due to the surface ruggedness of the particles as well as the internal surface areas provided by the cracks, fissures and pores occurring inside of the particles. In this regard, one of the evaluation items of a yttrium oxide powder is the discrepancy between or ratio of the specific surface area obtained by the BET method and the imaginary specific surface area calculated from the average particle diameter of the particles as mentioned above.

The second of the known methods for obtaining submicron particles of yttrium oxide, referred to as the urea method hereinafter, is a chemical method in which an aqueous solution of a water-soluble inorganic salt of yttrium is admixed with urea and the thus prepared reaction mixture is heated so that the urea in the solution is hydrolyzed into ammonium and carbonate ions which cause precipitation of fine particles of yttrium carbonate hydroxide having a submicron particle diameter followed by recovery of the precipitates and calcination thereof in an oxidizing atmosphere to convert the same into particles of yttrium oxide. A problem in this urea method is that, when yttrium oxide particles having an average particle diameter not exceeding 0.2 μm are desired as the product, the concentration of the yttrium salt in the aqueous reaction mixture must be kept so low as not to exceed 0.01 mole/liter relative to yttrium. Accordingly, the urea method is undertaken only in a laboratory scale and is practically not industrial due to the low productivity.

SUMMARY OF THE INVENTION

The present invention accordingly has an object to provide an improved urea method for the preparation of fine particles of yttrium oxide suitable for industrial production with high efficiency by overcoming the above described problems in the prior art methods. In particular, the inventive method is suitable for the preparation of fine yttrium oxide particles having a globular particle configuration with an average particle diameter $D_{50}$ in the range from 0.1 μm to 0.3 μm, of which the ratio of the specific surface area W obtained by the BET method and the imaginary specific surface area S estimated by calculation from the value of the average particle diameter $D_{50}$ of the particles assuming a perfectly spherical particle configuration and monodispersed distribution of the particle diameters, i.e. W/S, does not exceed 2.

Thus, the method of the present invention for the preparation of fine particles of yttrium oxide comprises the steps of:

(a) dissolving a water-soluble inorganic salt of yttrium and urea in water to prepare an aqueous reaction mixture, of which the concentration of the yttrium salt is in the range from 0.01 to 1.0 mole/liter or, preferably, from 0.06 to 0.2 mole/liter calculated for the yttrium ions and the amount of urea is in the range from 3 to 100 moles or, preferably, from 8 to 30 moles per mole of the yttrium ions;

(b) heating the aqueous reaction mixture at a temperature in the range from 80° to 100° C. or, preferably, from 90° to 100° C.;

(c) diluting the aqueous reaction mixture by the addition of water in such an amount that the overall concentration of yttrium in the diluted reaction mixture is in the range from 90% to 2% of the concentration before dilution, preferably, in the range from 0.02 to 0.08 mole/liter during a period between appearance of turbidity in the reaction mixture due to precipitation of yttrium carbonate hydroxide and a moment 30 minutes thereafter while keeping the temperature of the reaction mixture throughout in the range from 80° to 100° C. or, preferably, from 90° to 100° C. until completion of precipitation of yttrium carbonate hydroxide;

(d) collecting the precipitates of yttrium carbonate hydroxide from the aqueous reaction mixture; and (e) calcining the precipitates of yttrium carbonate hydroxide in an oxidizing atmosphere at a temperature in the range from 700° to 1300° C. to effect thermal decomposition of the yttrium carbonate hydroxide into yttrium oxide.

DETAILED DESCRIPTION OF THE PREFERRED EMBODIMENTS

As is described above, the present invention provides an improvement in the so-called urea method for the preparation of fine particles of yttrium oxide, in which an aqueous solution containing an inorganic salt of yttrium and urea is heated at an elevated temperature to effect hydrolysis of the urea with formation of hydroxyl ions and carbonate ions resulting in precipitation of yttrium carbonate hydroxide or basic carbonate of yttrium followed by oxidative calcination of the yttrium carbonate hydroxide particles into oxide particles.

Since the velocity of the hydrolysis reaction of urea in an aqueous solution is not so high, it is possible in the above mentioned urea method to control the length of time taken for complete precipitation of yttrium carbonate hydroxide within a range from several minutes to several hours by adequately selecting the concentrations of the yttrium salt and urea in the reaction mixture and the heating temperature. It is important in the inventive method that the concentrations of the yttrium salt and urea in the reaction mixture and the heating temperature are selected so that a length of at least 10 minutes is taken for completion of precipitation of the yttrium carbonate hydroxide.

As the precipitation reaction of yttrium carbonate hydroxide is proceeding, the aqueous solution as the reaction mixture heated at 80° to 100° C. or, preferably, 90° to 100° C. is diluted by the addition of water, which is preferably at a temperature of 80° to 100° C. or, preferably, 90° to 100° C., in such an amount or volume that the overall concentration of yttrium in the thus diluted reaction mixture is in the range from 90% to 2% of the concentration before dilution, preferably, in the range from 0.02 to 0.08 mole/liter while the temperature of the reaction mixture is kept at a temperature of 80° to 100° C. or, preferably, 90° to 100° C. throughout until completion of the precipitation reaction. The overall concentration of yttrium implied above is a total concentration of yttrium in the already precipitated yttrium carbonate hydroxide and the yttrium of the yttrium salt still in the liquid phase of the aqueous solution.

The particles of the yttrium carbonate hydroxide obtained in the above described manner with dilution of the reaction mixture after incipience of the precipitation reaction have an average particle diameter usually much smaller than the particles precipitated in an aqueous reaction mixture diluted prior to incipience of the precipitation reaction to the same diluted concentration of yttrium. The thus obtained fine particles of yttrium carbonate hydroxide are collected by separation from the aqueous medium of the reaction mixture by a suitable solid-liquid separation means such as filtration followed by washing with water, if necessary, and by drying and calcination in an oxidizing atmosphere such as air to be converted into particles of yttrium oxide, which have an average particle diameter $D_{50}$ of 0.1 μm to 0.3 μm with a very narrow distribution close to a monodispersed distribution and have an outstandingly globular particle configuration close to a sphere as examined on a scanning electron microscopic photograph.

When comparison is made between the specific surface area W of the thus obtained yttrium oxide particles determined by the BET method and an imaginary specific surface area S calculated for particles of yttrium oxide having the same average particle diameter $D_{50}$ with an assumption of a perfectly spherical particle configuration and a monodispersed distribution of the particle diameters, the ratio of W/S can well be smaller than 2. This small value of W/S is suggestive to support an assumption that the globular particles are substantially free from internal surface areas due to occurrence of defects such as cracks, fissures and pores in the particles.

In step (a) of the inventive method, an aqueous solution as the reaction mixture is prepared by dissolving a water-soluble inorganic salt of yttrium and urea in water. The water-soluble inorganic salt of yttrium can be selected, though not particularly limitative, from chloride, sulfate and nitrate, of which yttrium nitrate is preferred because the nitrate radicals adsorbed on the precipitates of yttrium carbonate hydroxide can, as compared with chlorine ions and sulfate radicals, completely be decomposed in the calcination of the carbonate hydroxide to cause little contamination of the yttrium oxide product.

The concentration of the yttrium salt, calculated as the yttrium element, in the starting reaction mixture is, usually, in the range from 0.01 to 1.0 mole/liter or, preferably, from 0.06 to 0.2 mole/liter. Use of a more dilute aqueous solution as the starting reaction mixture is not practicable due to the low productivity of the process in which an excessively large volume of the reaction mixture must be processed for the preparation of yttrium carbonate hydroxide particles. When the yttrium concentration in the starting reaction mixture is too high, on the other hand, agglomeration of the particles of yttrium carbonate hydroxide may take place in the precipitation medium so that the yttrium oxide particles obtained by calcination thereof have a somewhat larger average particle diameter with a broader particle size distribution than otherwise.

The amount of urea contained in the starting reaction mixture is in the range from 3 moles to 100 moles or, preferably, from 8 moles to 30 moles per mole of the yttrium salt calculated as yttrium. When the amount of urea is too small, even if over the stoichiometric amount, an unduly long time is taken for completion of the precipitation reaction of yttrium carbonate hydroxide while no particular additional advantages can be obtained by increasing the amount of urea to exceed the above mentioned upper limit rather with an economical disadvantage due to an unduly large cost for urea.

While the amount or concentration of urea in the reaction mixture and the reaction temperature are the factors having influences on the particle size of the yttrium carbonate hydroxide particles and hence of the yttrium oxide particles, it is a general trend that particles of a larger particle size are obtained by decreasing the amount of urea or by decreasing the reaction temperature. Agitation of the reaction mixture during proceeding of the precipitation reaction is not particularly required provided that uniformity of the temperature of the reaction mixture in the above mentioned range can be ensured until completion of the precipitation reaction.

The reaction mixture is maintained at a high temperature within the above mentioned relatively narrow rang in order to obtain a high velocity of the hydrolysis reaction of urea suitable for industrial preparation of the yttrium carbonate hydroxide precipitates and also to ensure constancy of the rate of formation of the hydroxyl ions and carbonate ions from urea for uniformity of the precipitates. When the reaction temperature is too low, the reaction velocity would be unduly low so that agglomeration of the primarily precipitated particles of yttrium carbonate hydroxide may take place. When the reaction temperature does not exceed the boiling point of the reaction mixture, the reaction can be undertaken under normal pressure without using any pressurizable reaction vessels so that the costs for expensive pressurizable reactors can be saved with little problems relative to safety.

It is important in practicing the inventive method that dilution of the reaction mixture by the addition of water in step (c) is conducted during the period between incipient appearance of white turbidity in the reaction mixture by the precipitation of fine particles of yttrium carbonate hydroxide and a moment 30 minutes after incipient appearance of turbidity in the reaction mixture. When the diluting water is added belatedly after lapse of 30 minutes from incipient appearance of turbidity in the reaction mixture, agglomeration of the primarily precipitated particles of yttrium carbonate hydroxide may take place. It is preferable that the diluting water added to the reaction mixture is heated in advance at a temperature in the range from 80° to 100° C. or, more preferably, at about the same temperature as the reaction mixture to be diluted with water in order that the temperature of the reaction mixture is little affected by the addition of the diluting water. Introduction of a volume of the diluting water can be made at one time although it is optional that introduction of the diluting water is conducted gradually or portionwise over the period of 30 minutes. Namely, it is important that the reaction mixture is kept at the high temperature throughout until completion of the precipitation reaction which usually takes more than 30 minutes from incipient appearance of turbidity in the reaction mixture.

The amount or volume of the water for dilution of the reaction mixture is such that the overall concentration of yttrium in the reaction mixture after dilution is in the range from 90% to 2% of that before dilution, preferably, in the range from 0.02 to 0.08 mole/liter.

Completion of the precipitation reaction can be confirmed when no yttrium ions can be detected in the supernatant of the reaction mixture. The overall reaction time including a certain length of an aging period after completion of the precipitation reaction is usually in the range from 1 to 3 hours after dilution of the reaction mixture by the addition of the diluting water.

In step (d) of the inventive method, the particles of yttrium carbonate hydroxide precipitated in the reaction mixture are collected by a suitable solid-liquid separating means such as filtration followed by drying. Washing of the precipitates with water is usually not necessary when the water-soluble salt of yttrium is yttrium nitrate.

Finally in step (e) of the inventive method, the particles of yttrium carbonate hydroxide are subjected to calcination in an oxidizing atmosphere such as air at a temperature in the range from 700° to 1300° C. or, preferably, from 800° to 1000° C. so that the yttrium carbonate hydroxide is thermally decomposed and converted into yttrium oxide. When the calcination temperature is too low, the thermal decomposition of the carbonate hydroxide would be too slow or incomplete so that the resultant yttrium oxide powder may contain a trace amount of carbonaceous impurity. When the calcination temperature is too high, on the other hand, the fine particles of yttrium oxide may be subject to sintering not to give discrete globular particles.

In the following, the method of the present invention for the preparation of fine globular particles of yttrium oxide is illustrated in more detail by way of examples and comparative examples, in which the yttrium oxide powders were evaluated for the following items (1) to (3) by the respective testing procedures described there.

(1) Average particle diameter $D_{50}$ ($\mu$m)

Measurement was made by using an instrument for the determination of particle size distribution utilizing the shift in the wavelength of a laser beam scattered at the particles by means of the Doppler effect.

(2) Specific surface area W (m$^2$/g)

Measurement was made by a simplified BET method in which the sample powder was chilled at the temperature of liquid nitrogen under an atmosphere of nitrogen gas to have the nitrogen adsorbed on the surface of particles followed by warming of the sample to room temperature to measure the volume of the desorbed nitrogen gas. The specific surface area in m$^2$/g could be calculated from this volume of desorbed nitrogen gas assuming the cross sectional area of the nitrogen molecules.

(3) Imaginary specific surface area S (m$^2$/g)

Calculation was made from an equation $$S=6/(\rho \times D_{50}),$$

in which $D_{50}$ is the average particle diameter in $\mu$m and $\rho$ is the true density of yttrium oxide in g/cm$^3$.

EXAMPLE 1.

An aqueous solution was prepared by dissolving, in deionized water, yttrium nitrate in a concentration of 0.06 mole/liter and urea in a concentration of 1.00 mole/liter and 3 liters of the solution were heated up to a temperature of 95° C. under agitation. When agitation of the solution was continued at the same temperature for 5 minutes, appearance of white turbidity was noted in the solution. At a moment after 2 minutes from incipient appearance of the white turbidity under further continued agitation, the solution was diluted by the addition of 3 liters of deionized water preheated at 95° C. The reaction mixture thus diluted was kept at the same temperature for further 90 minutes with formation of precipitates followed by filtration of the reaction mixture through filter paper on a Buchner funnel to collect the precipitates of yttrium carbonate hydroxide.

The wet cake of the precipitates was transferred to a sagger of fused silica glass and dried and calcined therein at a temperature of 800° C. for 2 hours in an atmosphere of air to give 20.1 g of a white powder which could be identified by analysis to be yttrium oxide. As examined with an electron microscope, the particles of this yttrium oxide powder had a globular particle configuration with a fairly uniform particle diameter of about 0.15 $\mu$m. Measurement of the particle size distribution by the laser beam method indicated that the average particle diameter $D_{50}$ was 0.20 $\mu$m with a narrow distribution. The specific surface area W of the powder as determined by the BET method was 7.1 m$^2$/g while the imaginary specific surface area S calculated from the $D_{50}$ value was 6.0 m$^2$/g so that the value of W/S was 1.18.

EXAMPLE 2.

An aqueous solution was prepared by dissolving, in deionized water, yttrium nitrate in a concentration of 0.12 mole/liter and urea in a concentration of 1.92 mole/liter and 3 liters of the solution were heated up to a temperature of 95° C. under agitation. When agitation of the solution was continued at the same temperature for 5 minutes, appearance of white turbidity was noted in the solution. At a moment after 2 minutes from incipient appearance of the white turbidity under further continued agitation, the solution was diluted by the addition of 6 liters of deionized water preheated at 95° C. The reaction mixture thus diluted was kept at the same temperature for further 90 minutes with formation of precipitates followed by filtration of the reaction mixture through filter paper on a Buchner funnel to collect the precipitates of yttrium carbonate hydroxide.

The wet cake of the precipitates was transferred to a sagger of fused silica glass and dried and calcined therein at a temperature of 800° C. for 2 hours in an atmosphere of air to give 40.2 g of a white powder which could be identified by analysis to be yttrium oxide. As examined with an electron microscope, the particles of this yttrium oxide powder had a globular particle configuration with a fairly uniform particle diameter of about 0.12 μm. Measurement of the particle size distribution by the laser beam method indicated that the average particle diameter $D_{50}$ was 0.20 μm with a narrow distribution. The specific surface area W of the powder as determined by the BET method was 7.9 m$^2$/g while the imaginary specific surface area S calculated from the $D_{50}$ value was 6.0 m$^2$/g so that the value of W/S was 1.32.

COMPARATIVE EXAMPLE 1.

A 100 g portion of a powder of yttrium oxide, of which the particles had an average particle diameter $D_{50}$ of about 5.5 μm, was subjected to mechanical comminution in a beads mill to give 98.5 g of size-reduced fine particles which had an irregular particle configuration with an approximate size of about 0.2 μm as examined with an electron microscope. Measurement of the particle size distribution by the laser beam method indicated that the average particle diameter $D_{50}$ was 0.20 μm with a broad distribution. The specific surface area W of the powder as determined by the BET method was about 29 m$^2$/g while the imaginary specific surface area S calculated from the $D_{50}$ value was 6.0 m$^2$/g so that the value of W/S was as large as 4.8.

COMPARATIVE EXAMPLE 2.

An aqueous solution was prepared by dissolving, in deionized water, yttrium nitrate in a concentration of 0.04 mole/liter and urea in a concentration of 0.64 mole/liter and 6 liters of the solution were heated up to a temperature of 95° C. under agitation. After keeping the reaction mixture at 95° C. for 97 minutes to effect complete precipitation of yttrium carbonate hydroxide, the reaction mixture was filtered through filter paper on a Buchner funnel to collect the precipitates of yttrium carbonate hydroxide.

The wet cake of the precipitates was taken in a sagger of fused silica glass and dried and calcined therein at a temperature of 800° C. for 2 hours in an atmosphere of air to give 33.6 g of a white powder which could be identified by analysis to be yttrium oxide. As examined with an electron microscope, the particles of this yttrium oxide powder had a globular particle configuration with a fairly uniform particle diameter of about 0.35 μm. Measurement of the particle size distribution by the laser beam method indicated that the average particle diameter $D_{50}$ was 0.40 μm with a narrow distribution. The specific surface area W of the powder as determined by the BET method was 6.6 m$^2$/g while the imaginary specific surface area S calculated from $D_{50}$ was 3.0 m$^2$/g so that the value of W/S was 2.2.

What is claimed is:

1. A method for the preparation of fine particles of yttrium oxide which comprises the steps of:

(a) dissolving a water-soluble inorganic salt of yttrium and urea in water to prepare an aqueous reaction mixture, of which the concentration of the yttrium salt is in the range from 0.01 to 1.0 mole/liter calculated for the yttrium ions and the amount of urea is in the range from 3 to 100 moles per mole of the yttrium ions;

(b) heating the aqueous reaction mixture at a temperature in the range from 80° to 100° C.;

(c) diluting the aqueous reaction mixture by the addition of water for dilution in such an amount that the overall concentration of yttrium in the diluted reaction mixture is in the range from 90% to 2% of the concentration before dilution during a period between incipient appearance of turbidity in the reaction mixture due to precipitation of yttrium carbonate hydroxide and a moment 30 minutes thereafter while keeping the temperature of the reaction mixture throughout in the range from 80° to 100° C. until completion of precipitation of yttrium carbonate hydroxide;

(d) collecting the precipitates of yttrium carbonate hydroxide by separation from the aqueous reaction mixture; and (e) calcining the precipitates of yttrium carbonate hydroxide in an oxidizing atmosphere at a temperature in the range from 700° to 1300° C. to effect thermal decomposition of the yttrium carbonate hydroxide into yttrium oxide.

2. The method for the preparation of fine particles of yttrium oxide as claimed in claim 1 in which the water-soluble inorganic salt of yttrium is yttrium nitrate.

3. The method for the preparation of fine particles of yttrium oxide as claimed in claim 1 in which the temperature of the aqueous reaction mixture in steps (b) and (c) is in the range from 90° to 100° C.

4. The method for the preparation of fine particles of yttrium oxide as claimed in claim 1 in which the water for dilution in step (c) is preheated at a temperature in the range from 80° to 100° C.

5. The method for the preparation of fine particles of yttrium oxide as claimed in claim 1 in which the concentration of the yttrium salt in the aqueous reaction mixture prepared in step (a) is in the range from 0.06 to 0.2 mole/liter calculated for the yttrium ions.

6. The method for the preparation of fine particles of yttrium oxide as claimed in claim 1 in which the amount of urea in the reaction mixture prepared in step (a) is in the range from 8 to 30 moles per mole of the yttrium ions.

7. The method for the preparation of fine particles of yttrium oxide as claimed in claim 1 in which the overall concentration of yttrium in the reaction mixture after dilution in step (c) is in the range from 0.02 to 0.08 mole/liter.

* * * * *